Dec. 7, 1971   J. OBERWAGER   3,624,923
VISUAL TEACHING DEVICE
Filed Oct. 24, 1969   4 Sheets-Sheet 1
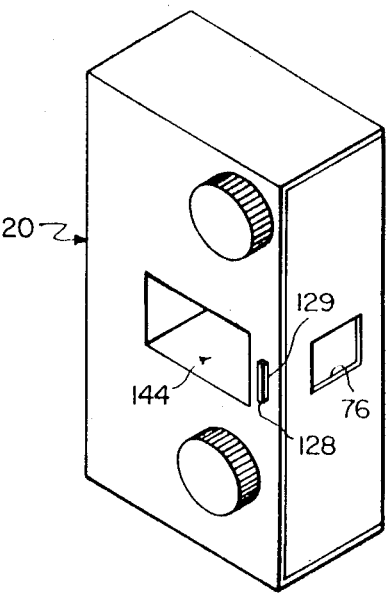
FIG. 1
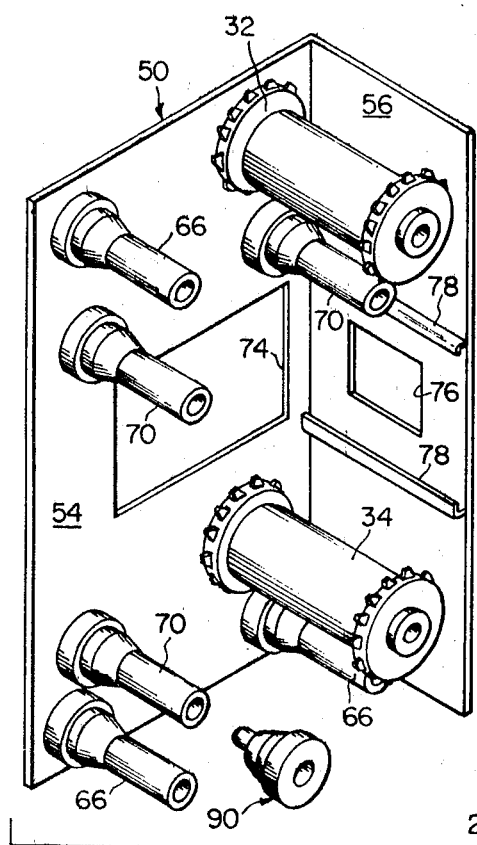
FIG. 2
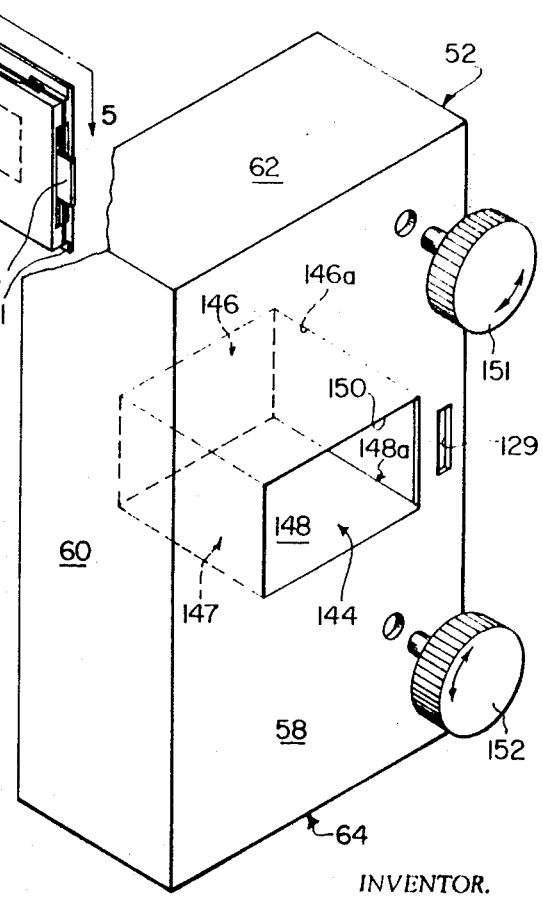
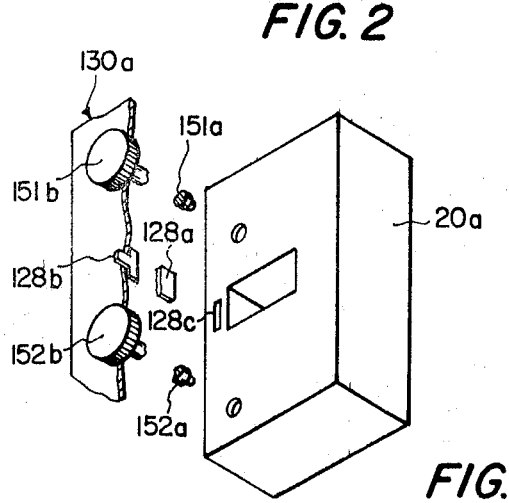
FIG. 7
INVENTOR.
JEROME OBERWAGER
BY Edward Halle
ATTORNEY.

Dec. 7, 1971    J. OBERWAGER    3,624,923
VISUAL TEACHING DEVICE
Filed Oct. 24, 1969    4 Sheets-Sheet 2
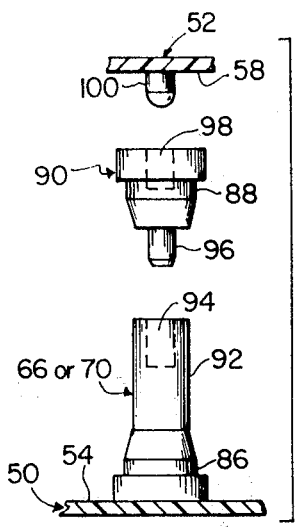
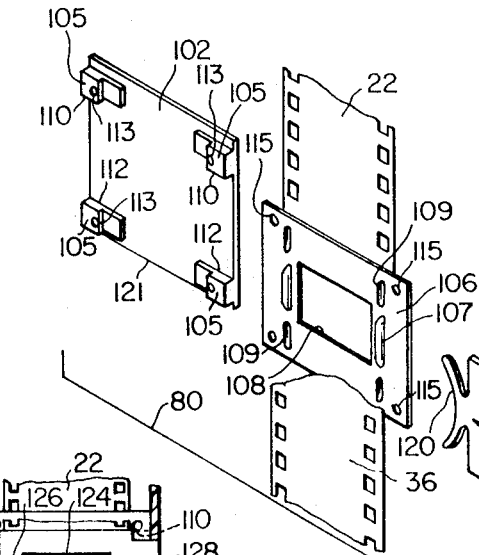
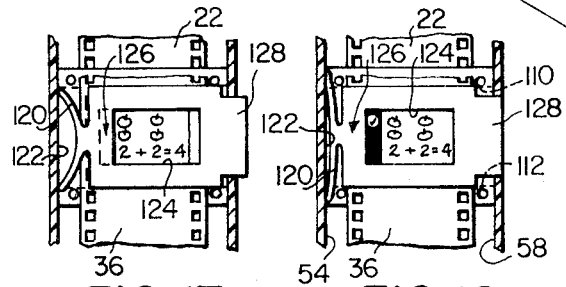
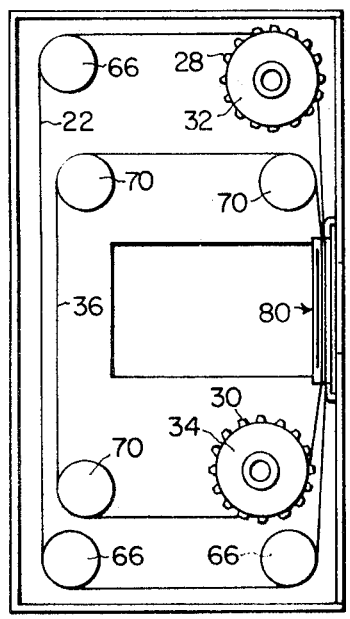
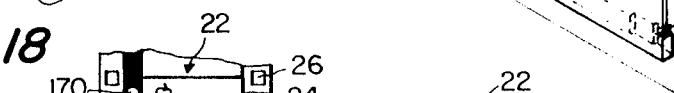
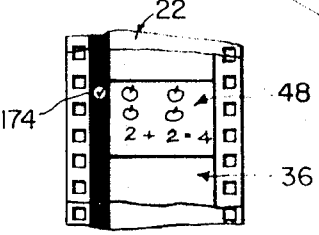
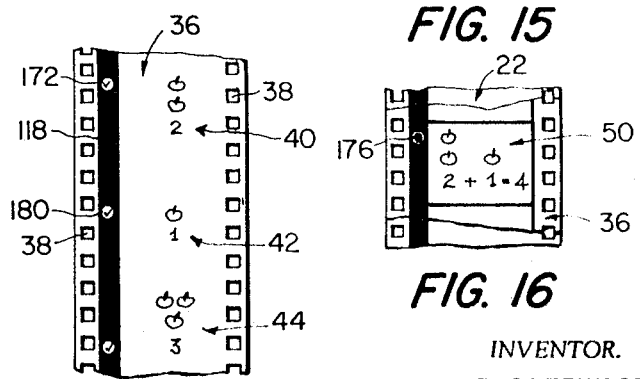
INVENTOR.
JEROME OBERWAGER
BY Edward Halle
ATTORNEY.

Dec. 7, 1971  J. OBERWAGER  3,624,923
VISUAL TEACHING DEVICE
Filed Oct. 24, 1969  4 Sheets-Sheet 3

INVENTOR.
JEROME OBERWAGER
BY Edward Halle
ATTORNEY.

Dec. 7, 1971   J. OBERWAGER   3,624,923
VISUAL TEACHING DEVICE
Filed Oct. 24, 1969   4 Sheets-Sheet 4
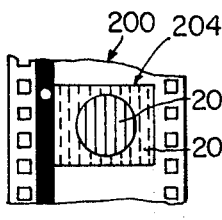 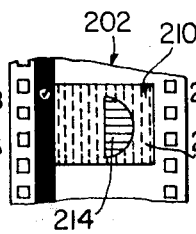 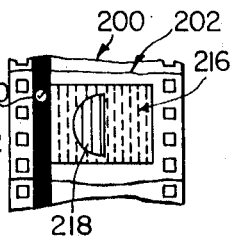 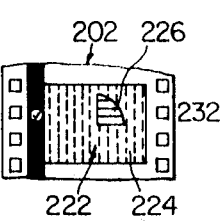 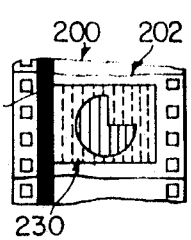
FIG. 19    FIG. 20    FIG. 21    FIG. 22    FIG. 23
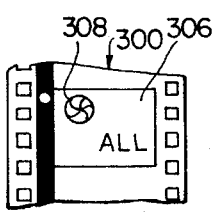 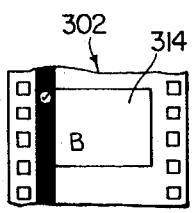 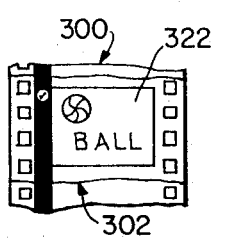 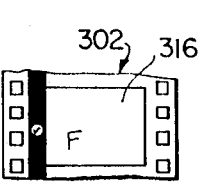 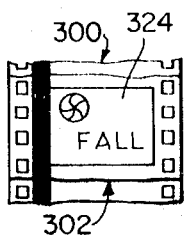
FIG. 24    FIG. 25    FIG. 26    FIG. 27    FIG. 28
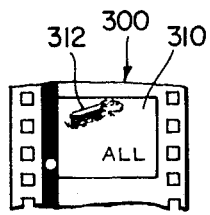 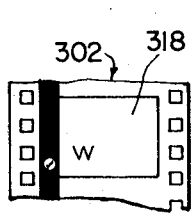 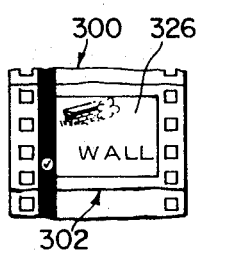 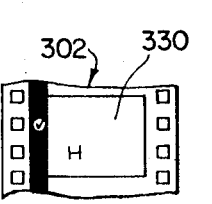 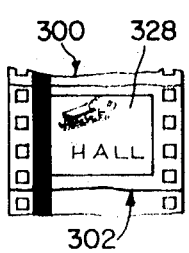
FIG. 29    FIG. 30    FIG. 31    FIG. 32    FIG. 33
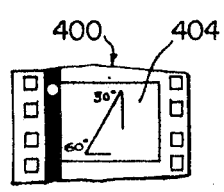 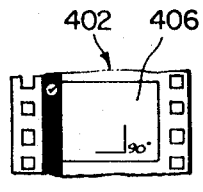 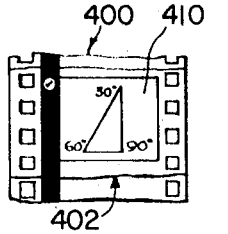 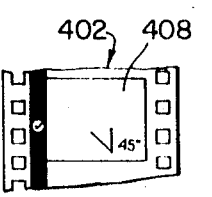 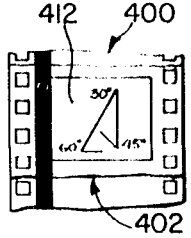
FIG. 34    FIG. 35    FIG. 36    FIG. 37    FIG. 38
INVENTOR.
JEROME OBERWAGER
BY Edward Halle
ATTORNEY.

United States Patent Office 3,624,923
Patented Dec. 7, 1971

3,624,923
VISUAL TEACHING DEVICE
Jerome Oberwager, 30 Wensley Drive,
Great Neck, N.Y. 11021
Filed Oct. 24, 1969, Ser. No. 869,129
Int. Cl. G09b 1/24
U.S. Cl. 35—9 E                                30 Claims

ABSTRACT OF THE DISCLOSURE

This invention is a visual teaching device of the type in which the student is provided wiht a series of problems and a choice of answers, and in which the student may continuously check his solutions as he goes through the teaching program of the device. The basis of this invention is one or more pairs of translucent film strips as contained within a cartridge means having an aperture for viewing or projection, together with means to independently move the strips so that a frame of a question strip and a frame of an answer strip can be placed in proper superimposed register within the aperture means to provide a composite visual problem-solution, which presents to the student in one frame a composite of the problem and answer material as a single picture. This single picture solution may either be correct or incorrect. The frames of each strip comprise separate coding portions to indicate whether the composite visual obtained is a correct or incorrect solution, said coding sections being hidden by a normally closed shutter which may be opened by the student at any desired interval to conform the correctness of his solution.

This invention is a visual teaching device of the type in which the student is provided with a series of problems and a choice of answers, and with which the student may continuously check his solutions as he goes through the teaching program of the device. The basis of this invention is one or more pairs of film strips as continued within a cartridge means having an aperture. There are means to move the film strips independently so that one of the frames of the question strip and one of the frames of the answer strip can be placed in proper register, within the aperture, to provide a problem solution. The films are translucent and when a frame of the question strip and a frame of the answer strip are placed in register within the aperture, they will be viewed as a single composite visual.

The answer checking components of the invention comprise a coding section for each frame of each film. When the film frames are in register for the proper solution, this is verified by the proper registration of the coding sections of the frames.

Means such as a shutter in normally closed position are provided to mask the superimposed coding sections during the problems solving operation of the device, and a shutter operating means is provided to open the shutter so that the student can verify his solutions during the learning process provided by the invention.

The cartridge of the device is adapted to be used universally as a cartridge for a projector for front or rear screen projection to a group of students, or as a viewing device for an individual student who will look through the aperture of the cartridge toward background light and see the films directly, or with the aid of an eyepiece lens. The preferred film size for such a universal type cartridge is the usual 35 mm. film normally used in 35 mm. still cameras and motion picture cameras. For individual viewing, the cartridge may be implemented with auxiliary lighting equipment and magnification viewing lenses, or it may be designed for a larger film size which will need no magnification.

In essence, it is an object of this invention to provide means for the student to compose a picture or arrangement of elements from frames of separate films in which the elements from a first film and the elements from a second film will provide a composite visual when frames containing the proper elements are placed in registration by the student to form a picture, or arrangement of elements. Some of these composite visuals will be incorrect and some will be correct. This can be verified at any time by the student.

The advantages of the invention are in the production of a solution of the problem by the student in a manner which provides a total single composite visual solution of the problem, together with means for checking the incorrect and correct solutions and which may be self operated by the student at the best rate of speed for his learning ability, or which may be used by large groups of students with an instructor.

The preferred embodiments of the invention are set forth in the specification below and in the accompanying drawings in which:

FIG. 1 is a perspective view of a cartridge of the invention;

FIG. 2 is an exploded perspective of the cartridge;

FIG. 3 is an exploded elevational detail of the cartridge construction with parts cut away;

FIG. 4 is an exploded perspective of the components of the aperture mechanism and the coding shutter mechanism;

FIG. 5 is a sectional view along the lines 5—5 of FIG. 2;

FIG. 6 is a diagrammatic view of the interior of the cartridge of the invention with the film strips in position;

FIG. 7 is a perspective view of an alternate form of cartridge in which the controls for reeling the film and working the shutter are worked through the projector, showing parts of the projector in cut away fashion in exploded perspective to the cartridge;

FIG. 13 is a portion of a first film strip of the invention;

FIG. 14 is a portion of a second film strip of the invention;

FIG. 15 shows a proper registration of frames of the first film strip of FIG. 13 and a second film strip of FIG. 14 to provide a correct composite visual solution;

FIG. 16 is a view similar to FIG. 15 showing an incorrect composite visual solution;

FIG. 17 is a sectional view of the cartridge as seen from the plane immediately behind the shutter with the shutter shown in closed position;

FIG. 18 is a view similar to FIG. 17 showing the shutter in open position;

FIG. 19 shows an alternate form of first strip for the invention showing a problem involving the use of color in which the background is lined for purple and the circular midsection is lined for red;

FIG. 20 is an alternate form of second strip of the invention showing a proper complementary frame to the frame shown in FIG. 19;

FIG. 21 is a proper composite visual solution combining the frames of FIG. 19 and FIG. 20 of the invention;

FIG. 22 shows another part of the second strip of the invention shown in FIG. 20 having an improper complementary frame;

FIG. 23 shows an incorrect composite visual solution combining the frames of FIG. 19 and FIG. 22 in registration;

FIG. 24 is an elevational view with parts cut away of another first strip of the invention;

FIG. 25 is a view similar to FIG. 20 showing another second strip of the invention;

FIG. 26 is a view similar to FIG. 21 showing a correct composite visual solution combining FIGS. 24 and 25;

FIG. 27 is a view similar to FIG. 22 showing another second strip portion having an incorrect complementary portion;

FIG. 28 is a view similar to FIG. 23 showing an incorrect composite visual formed by the combination of the frames of FIG. 24 and FIG. 27;

Figure 8:
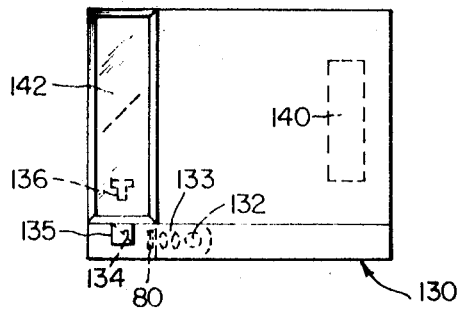
FIG. 8 is a top plan view of a projector for use with the cartridge with parts in phantom.

FIGS. 29 to 33 inclusive show another form of portions of first and second strips of the invention in an order similar to FIGS. 19 through 23 inclusive showing a portion of a first strip, a portion of a second strip, a correct composite visual, another portion of the second strip, and an incorrect composite visual respectively; and FIGS. 34 through 38 inclusive show still another first and second strip of the invention in a manner similar to that of FIGS. 29 to 33 inclusive;

Similar numerals refer to similar parts throughout the several views.

The essence of the invention lies in the formulation of a composite visual picture or arrangement of words or symbols or other elements on the first strip and second strip films to provide a correct solution to the problems posed. I used the term "composite visual" for the concept of selected frames of the first and second strips of the invention as seen in registration. The term "visual" as used herein means a portion of program material made up of images, pictures, letters of the alphabet, words, numerals, symbols or any other thing that can be seen visually either on the film or on a projection of the film, including colored things as described hereinbelow. The choice of color and the use of color being one of the elements capable of making up the visual, and the composite visual. It is understood that the composite visual is a combination of a plurality of visual on separate films, the composite being made as aforesaid by selecting frames containing visuals on a plurality of films and viewing said selected frames in registration. It is also to be understood that any one or more of the foregoing types of visuals may be combined to make up a composite visual as contemplated by the invention.

Another important feature of the invention is the construction provided to house the films in a proper housing such as the cartridge 20. The terms "question film" and "answer film," as they may be used herein, are relative terms since the composite visual picture which provides the solution to the problem will be a composite of both the question film and the answer film, and it is to be understood that the use of the words "question" and "answer" herein are merely to signify the two parts of the composite represented by the separate films of the first strip and second strip.

It will appear in this specification that the type of material which may be placed on the film may not actually be a question, but may pose a part of a problem which is solved by matching the visuals of the frames of the films together. This will be understood by referring to FIGS. 13 through 16 of the drawings. In FIG. 13, I show a web, or strip, such as a film 22 having a plurality of frames such as frame 24. The film 22 as shown in representative of the usual type of 35 mm. film currently in use, and is provided with holes 26 adapted to be engaged by toothed means such as the teeth 28 and 30 of sprockets 32 and 34 respectively. The film may be any type of web, or strip, which can be used to project a view, or to be viewed through a viewer in the usual manner of viewing such films.

In FIG. 14 of the drawings, I show another web, or film, 36 having sprocket holes 38 and separate frame divisions 40, 42, and 44. In the film 36 it should be noted that the frames 40, 42 and 44 are not shown divided by a frame divider such as frame divider 46 shown in FIG. 13. FIG. 14 is illustrated in this manner to demonstrate that it is not absolutely necessary to divide the frames in which the various stimuli are contained on the film. This is optional as the proper matching of the material between films 22 and 36 can be achieved without the use of frame dividers 46. However, for the convenience of illustration and demonstration, I shall refer to each separate visual stimulus group as being within a "frame" of the film. For example, the two apples and the number 2 represented by reference numeral 40 may be referred to as frame 40; the one apple with number 1 at reference numeral 42 may be referred to as frame 42, and the three apples with number 3 at reference numeral 44 may be referred to as frame 44. By the same token, the composite visual formed in FIG. 15 by the registration of frames 24 and 40 containing two apples over the number 2 and a plus sign, two apples, each over the number 2, and an equal sign, and the number 4 will be collectively referred to as a composite visual in combined frame 48. The combined composite visual frame is, of course, made by superimposing film 22 and film 36 in a manner to select the desired frames and place them in register.

FIG. 16 shows another composite visual frame 50 made by superimposing frame 24 and frame 42. This is an example of an incorrect solution. The method of working the invention and the coding method will be explained hereinbelow after the cartridge 20 and its applications have been described.

Cartridge 20 is comprised of a base plate 50 and a cover 52. Base plate 50 comprises a side wall 54, an end wall 56, and cover portion 52 comprises a side wall 58, an end wall 60, a top wall 62 and a bottom wall construction 64 so that when both parts are put together, a complete housing is provided for the cartridge 20.

Base plate 50 is provided with studs 66 and sprocket means 32 around which to place a closed loop of a web or film such as a first film or question film 22. There are also studs 70 and sprocket means 34 around which to place a second, or answer, film 36. The base plate is also provided with an opening 74. The wall 56 is provided with an opening 76 and has a pair of aperture mounting guides 78 into which the aperture assembly 80 is fitted. The studs 66 or 70 are molded into plate 50, and as shown in FIG. 3, are made in such a way that the film will touch the stud 66 or 70 only at its edges corresponding to the stud portions at reference numerals 86 and 88.

This is accomplished by tapering the body of the stud 66 or 70, inwardly, to central portion 92, and by providing a flanged press button 90 with its annular surface 88 wider than the central portion 92. The press button is pressed into the stud at end 94 by means of pin 96. The press botton 90 also has a recessed portion 98 adapted to receive a pin 100 which is molded on the inside of wall 58 of the cover portion 52. Thus, for each stud 66 or 68, there is a press botton 90 and a corresponding pin 100 so that when the films are placed on the studs and around the sprocket means, the parts 50 and 52 can be pressed together to form a complete cartridge 20. When the device is made out of molded plastic, this provides a good press fit which is substantially durable and dustproof.

In addition to protecting the emulsion on the film by providing annular portions 86 and 88 on each stud, provision has also been made to protect the films 22 and 36 from rubbing against each other in the aperture assembly 80.

Aperture assembly 80 is comprised of a subhousing comprising a face plate 102 and a rear plate 104. Both of these plates are made of a heat resistant window-clear plastic so that they will be transparent to permit the passage of light. They will also help in keeping the cartridge dustproof.

Sub-housing pieces 102 and 104 are provided with guide elements 105 to hold an aperture plate 106 having an aperture 108. The formation also provides guides 110 and 112 for a shutter mechanism 114. The shutter mechanism is provided to conceal the coding areas 116 and 118 as will be described hereinbelow. The shutter mechanism 114 operates laterally in the aperture assembly 80. It is kept in normally closed position by means of a spring 120 which acts against portion 122 of side wall 54. The shutter mechanism has an open portion 124 and a shutter portion 126. It is moved laterally from a normally closed position (as in FIG. 17) to an open position (as in FIG. 18) by means of manually operated push button 128.

Reference to FIG. 4 will show that the films 22 and 36 are placed on either side of aperture plate 106, and that they are guided by the guides 105 as well as by guides 107 and 109 designed both to protect the films and to keep them in alignment. The aperture plate 106 is made as thin as possible so that the films may be placed within close tolerance for the best registration.

The elements of the shutter assembly 80 are all fitted together by means of four pins 111 which fit through apertures 113 on the face plate, apertures 115 on the aperture plate and apertures 117 on the rear plate. The pins 111 are so positioned that they are tangent to the edges of guides 105 which serve as the film guides. The upper and lower edges 119 and 121 respectively of the face plate 102 serve as flanges which fit within guides 78 to position to aperture assembly 80 behind opening 76 in wall 56.

Figure 9:
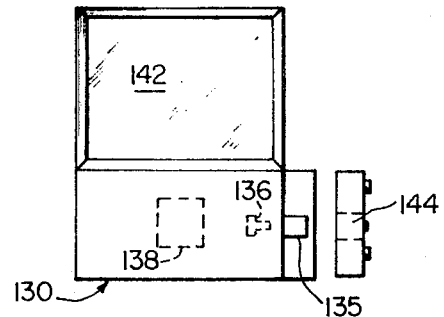
FIG. 9 is a front elevational view of the projector as shown in FIG. 8 with parts in phantom and a cartridge shown in exploded position.
Figure 10:
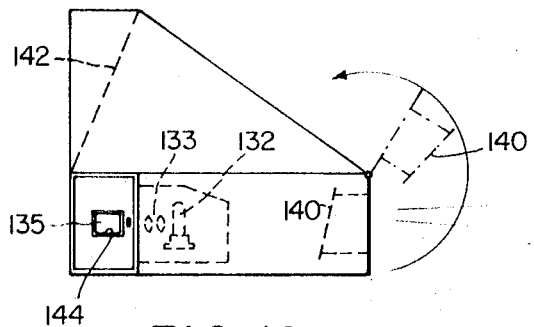
FIG. 10 is an elevational view of the projector of FIGS. 8 and 9 with parts in phantom and associated with a screen with part of the light pathway cut away.

The cartridge 20 is adapted to be used with a projector such as the type illustrated in FIGS. 8, 9 and 10. It will be noted that the projector 130 has a light source 132 comprising a light condenser means directed toward a mirror 134 which in turn is directed toward a lens system 136, thence toward a mirror 138, thence toward a mirror 140, and thence toward a ground glass screen 142. The cartridge 20 has a central opening 144 which is formed by opening 74 in the base portion 50, and by the construction of the cover 52. Cover 52 has internal walls 146, 147 and 148 and an opening 150. This construction together with opening 74 in base 50 provides for the central core opening 144 in the cartridge 20. It will also be noted that aperture assembly 80 is placed in position on guides 78 and cover 52 is pressed over base 50. The rear surface of rear plate 104 will form a fourth internal wall which, together with walls 146, 147 and 148 complete the central core opening 144. In addition, shutter operating button 128 will come through opening 129 and be in position for operation as shown in FIG. 1.

Thus, when central core opening 144 of cartridge 20 is positioned around housing 135 of the projector which contains mirror 134, the films 22 and 36 within aperature assembly 80 will be placed between the light source 132 and the mirror 134 and will thus be in a position to be projected by the projector. The cartridge is completed by providing for manual turning knobs 151 and 152 which are attached to sprockets 32 and 34 respectively through openings in the cover 52. It is understood that when knob 151 is rotated in either direction as shown in the double headed arrow, it will move film 22 in either direction, and it is further understood that when knob 152 is rotated in the direction of its double headed arrow, it will move film 36 in either direction, and that both of these films can be moved independently by means of each of the film advance or moving systems connected to knobs 151 and 152 respectively. Thus, any selected frame in either of the films 22 or 36 can be placed and superimposed against each other within the aperture formed by opening 108.

In FIG. 7 of the drawings, I show an alternate form of cartridge 20a in which the sprockets (not shown) 32 and 34 are operated by shafts 151a and 152a which project from an alternate form of projector 130a. The shafts 151a and 152a are operated manually by knobs 151b and 152b. In addition, alternate form of projector 130a has a push rod 128a adapted to push into the cartridge at opening 128c to contact the shutter mechanism and push rod 128a has a manually operated button 128b which is located on the projector 130a. In other words, alternate cartridge 20a has its control features as shown in FIG. 7 placed on the opposite side relatively to that of cartridge 20, and there is provision in the type of projector with which cartridge 20a is to be used to operate the cartridge manually through controls in the projector which fit into the cartridge as indicated in FIG. 7 of the drawings.

It should be clear now that the cartridge is kept dustproof by means of the fit of the aperture assembly 80 before opening 76 on guide 78, and also the close fit between the edges 146a and 148a of walls 146 and 148 against the rear face of rear plate 104. It is most important that the cartridge should be kept dustproof because any dust or grit that gets into the cartridge 20 will probably find its way into the space where the film goes through the aperture assembly 80 as well as in other parts of the cartridge, and will result in grit or dirt lines being cut into the film as the film is drawn through the apparatus. Such lines created by scratching against the emulsion of the film will damage the film. The composite visuals obtained will be greatly impaired and the cartridge itself may become inoperative.

Figure 11:
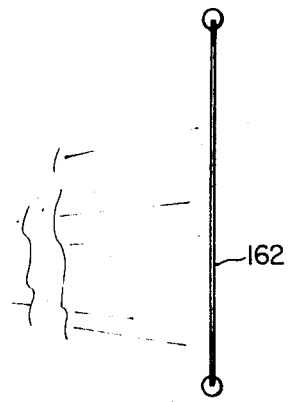
FIG. 11 shows a cartridge of the invention mounted on an individual viewing device in side elevation.
Figure 12:
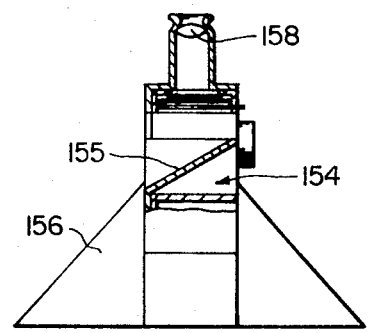
FIG. 12 is a sectional view along the lines 12—12 in FIG. 11.

Reference to FIGS. 11 and 12 of the drawings will show the cartridge 20 mounted on a reflector housing 154 of an individual viewing stand 156. The individual viewing stand has a reflector housing 154 in which a reflector 155 is positioned to direct light through the aperture 108 of the cartridge 20 so that the viewer may see the films through the opening 76. The viewing stand 156 as shown in FIGS. 11 and 12 also has magnifying lens means 158 to aid in viewing.

Reference to FIG. 10 will show that a rear wall 160 in projector 130 is adapted to be swung upwardly. This removes mirror 140 from the light ray path, and instead of projecting as a rear screen projector on screen 142, the projector 130 may be used to project directly on the front of a screen such as screen 162.

I have thus described the cartridge 20 of the device in its preferred form which may be used on a front screen projector, a rear screen projector and an individual viewing device. The cartridge 20 also has operating knobs 151 and 152 or their equivalents so that the operator can change the frames in the question film 24 or the answer film 36 respectively and form different composite pictures or arrangements, some of which may be correct and some of which may be incorrect. These composite visual pictures such as picture 48 or picture 50 will appear on screen 142, or screen 162, or can be seen through lens system 158.

In order to provide the student with an immediate check on whether his solution is correct or incorrect, the invention provides coding sections. There is a coding section, or strip, 116 on film 22 which is generally opaque with the exception of a clear code registration portion 170 associated with each question frame such as frame 24. There is also a coding section, or strip, 118 on film 36 which is generally opaque with the exception of a clear portion 172 associated with each answer frame such as frame 40. The clear portion 172 in the second or answer film 36 contains a check within it. Reference numeral 174 in FIG. 15 of the drawings points toward the superimposed clear portions 170 of the question film and 172 of the answer film which contains a check within the clear portions. This indicates that frame 48 is a correct composite visual picture or arrangement which shows a proper solution to the material contained within the frames of the question 22 and answer 36 films.

I refer now to FIG. 16 of the drawings which shows an incorrect solution in frame 50. Reference to the coding portion 176 shows it to be completely opaque. This is because a clear portion such as portion 170 as shown in FIG. 13 does not match up with the clear portion such as checked clear portion 180 shown in FIG. 14 at frame 42. This is because the relative distance from the top of the frame of clear portion 170 is different than that of clear portion 180. In FIG. 15 of the drawings, the relative distance of clear portion 170 and clear portion 172 which make up the clear superimposed coding portion 174 are the same and they come in register when frames 24 and 40 are in register to produce composite visual frame 48.

I have found that when using a 35 mm. film with a coding portion of the relative size as shown in the drawings, that I may provide for many coding areas to accommodate the correct solutions necessary for the operation of the device by varying the position of clear portions such as portion 170 and portion 172, it being understood that a correct solution will always be shown when such clear portions are in coincidence with each other. All the student has to do is press button 128 and move the shutter portion 126 to discover whether his solution is correct. The coded portion will either appear black or with a check in a clear portion on the screen or through the viewer, giving the student an immediate corroboration. It is to be understood that in making the device and the film strips 22 and 36, the coding portions may be smaller than shown in the figures of the drawings of this application. There should be at least 20 coding ciricles in each frame of each film strip so that an adequate number of problems can be provided in each cartridge 20.

In illustrating this invention, I have shown two films 22 and 36, and have indicated a single problem with several solutions, showing one correct answer and one incorrect answer. It is, of course, to be understood that more than two film strips or closed loops can be used to provide for differently arranged problems. It is also understood that the problems can be stated by either words or symbols or any other type of program material.

For example, FIGS. 19 through 23 of the drawings show another form of film material on which the problems and solutions are based on the use of colors. FIG. 19 shows a portion of a question strip film 200. FIGS. 20 and 22 show portions of an answer strip film 202. Frame 204 of film 200 would be part of a problem which would be stated as follows: "Divide this circle in half." Frame 204 has a background of purple indicated at reference numeral 206 and the circle portion is red indicated at reference numeral 208. The correct answer frame 210 on film 202 also has a background of purple as at reference numeral 212 and a semi-circular central portion of blue as at reference numeral 214. When frames 204 and 210 are superimposed as shown in FIG. 21 to form a composite visual frame 216, the resolution of colors red and blue will appear as purple, blending with the background, thus, in effect, "erasing" or transforming the right hand semi-circle of red circle 208 into a purple semi-circle blending with the background and leaving only the left semi-circle in red as at reference numeral 218. Thus, the correct solution will appear readily visible to the student as a half or semi-circle and can be checked by reference to the code as indicated at reference numeral 220.

FIG. 22 shows a frame 222 which is in an incorrect answer frame. It again has a purple background 224 but differs from FIG. 20 in that it shows a blue quarter circle 226 so that when frame 224 and frame 204 are superimposed to make a composite visual frame 230 as in FIG. 23, a red three-quarter circle will appear which is an incorrect answer. A check of the coding will show at reference numeral 232 that there is no check indicating an incorrect solution.

Another set of question and answer film strips 300 and 302 are illustrated in FIGS. 24 through 33 of the drawings. Here the question associated with frame 306 would be: "Complete the word representing the picture." This presents a problem in spelling. The picture 308 is a ball and the first letter of the word "ball" is missing in frame 306. In FIG. 29, frame 310 would require the student to complete the word "wall" which is represented at reference numeral 312 as a wall. The answer film 302 which is shown in FIGS. 25, 27, 30 and 32 contain frames 314, 316, 318 and 320 containing single letters B, F, W and H respectively. FIG. 26 shows a frame 322 in which frames 306 and 314 are in register as a composite visual to complete the correct spelling of the word "ball," and FIG. 28 shows a composite visual frame 324 combining frames 306 and 316 to show the incorrect solution "fall." Reference to FIG. 31 shows a correct solution composite visual 326 which combines frames 310 and 318 and reference to FIG. 33 shows an incorrect composite visual 328 combining frames 310 and 320.

Thus, in a spelling problem, the student can be asked to complete the word in a visual situation where he can see what he is doing and see what is required of him. This, of course, can be amplified in any number of ways where a problem can be stated having a sentence with one or more words missing and having the student supply the missing word or words from an answer strip.

FIGS. 34 through 38 show another alternate set of question and answer strips 400 and 402. These present problems in geometry. The question frame 404 shows a triangle with two sides and two angles indicated. The problem would be to supply the missing angle. By moving the solution strip 402, the student sees various angles such as the correct 90 degree angle shown in frame 406 and an incorrect 45 degree angle as shown in frame 408. Composite visual 410 shown in FIG. 36 is, of course, the correct answer and combines frames 404 and 406. Composite visual 412 shown in FIG. 38 is an incorrect answer and combines frames 404 and 408.

It will be appreciated that the invention described hereinabove makes it possible to see a problem as well as the solution to the problem either on a screen or directly on the film, and to see such problem and its solution in a proper visual perspecive in the "composite visual" of the invention. For example, in an ordinary teaching machine where there are problems and answers, the students may be required to press a button to indicate the correct answer. He may then receive a visual or an auditory stimulus to indicate whether his answer is correct or incorrect. The question and answer may appear on different parts of the machine or on different parts of program webs or on separate cards or in other ways, usually quite separate and not as a single composite visual. In the system of my invention, the student or learner can see the actual correct solution in its proper perspective with the problem, and can reinforce this knowledge with an immediate check. This is equally true whether the problem consists of letters, words, symbols or other images. In addition, this system permits the use of color and color codes as described hereinabove as a new tool for teaching.

I have described my invention in its preferred forms. However, there are other forms of preparing transparencies with frames to provide composite visuals in accordance with the invention. For example, transparencies may be prepared on discs having a central hub with the frames around the periphery of each disc. A plurality of such discs can be placed on a central axis and frames of each disc can be maneuvered into registration position in accordance with the invention.

There are other systems on which transparencies having frames in accordance with the invention can be mounted; for example, rectangular film carriers used in microfilming devices well known to the art.

In all of these systems, a coding arrangement in accordance with the invention can be placed in a coding portion in each frame, and a suitable shutter can be incorporated in a viewing or projection device in accordance with the invention.

The transparencies may be made of photographic film or other materials on which photographic film is mounted. The transparencies may also be made of transparent printer's ink on transparent plastic or paper, or any other suitable transparent material treated by any printing process which will result in a transparency.

Wherefore I claim:

1. A teaching system comprising, a first transparency having a plurality of frames thereon containing program material and a second transparency having a plurality of frames thereon containing program material related to said first mentioned program material, means to move each of said transparencies independently to position a selected frame of each transparency into substantial superimposed registration with each other, wherein the program material of said selected frames of said transparencies, when viewed in substantial superimposed register, forms a single image combining said program material into a composite visual, a coding portion for coding means in selected frames of the first transparency and in selected frames of the second transparency with the coding means positioned on each of said transparencies so that they are in superimposed registration to indicate a correct composite visual when the proper frames of each of said transparencies are in said superimposed registration, and shutter means in normally closed position to conceal the coding means, said shutter means including operating means to move the shutter to expose the coding means.

2. The teaching system as claimed in claim 1 comprised in a cartridge having a housing including aperture means, film guide means and film advance means, in which said first transparency is a strip, and in which the second transparency is a strip, both strips being adapted to be placed within said film guides in said housing, said strips being placed so that the frames of each strip move in parallel planes within the said aperture means.

3. The teaching system as claimed in claim 2, in which the cartridge comprises a central core and in which said first strip is in the form of a closed loop and in which said second strip is in the form of a closed loop with the closed loops of both strips being positioned adjacent said central core.

4. The teaching system as claimed in claim 3, in which the central core has at least one transparent plate.

5. The teaching device as defined in claim 1, in which the first transparency is a problem transparency comprising a plurality of problems visually set forth on the frames of the transparency, and the second transparency is a solution transparency comprising a plurality of solutions as set forth on the frames of the transparency, and in which for each of the problem frames there is only one solution frame which will match to form a correct composite visual the coding means on each transparency are arranged to indicate a registration match for a correct composite visual for the frame on the solution transparency with relation to the frames on the problem transparency.

6. The teaching system as claimed in claim 1, which comprises a removable cartridge comprising a housing including aperture means, transparency guide means and advance means, both transparencies being adapted to be placed within said guide means in said cartridge housing, said transparencies being placed so that the frames of each transparency move in parallel planes with relation to said aperture means.

7. The teaching system as claimed in claim 6 which includes light ray deflection means positioned to deflect rays of light having pathways generally parallel to said parallel planes of said transparencies and rays of light having pathways generally perpendicular to and through said aperture.

8. The teaching system as claimed in claim 1 comprised in a cartridge having a housing including aperture means and a central core, in which the means to move the transparencies comprises strip guide means and strip advance means, in which said first transparency is a strip in the form of a closed loop, and in which the second transparency is a strip in the form of a closed loop, both strips being adapted to be placed within said strip guide means in said housing in a position surrounding said central core, said strips being placed so that the frames of each strip move in parallel planes within the said aperture means.

9. The teaching system as defined in claim 8, in which the aperture means comprises parallel alignment guide means and an aperture plate positioned to hold the said strips in parallel relationship within close tolerance to said aperture plate.

10. The teaching system as defined in claim 9, in which the aperture means is included in an aperture assembly comprising an aperture plate having an opening of the same relative size of the frames of each of said strips, together with a transparent front plate and a transparent rear plate, said transparent rear plate forming a part of said central core opening in the cartridge.

11. The teaching system as defined in claim 10, in which the central core opening is adapted to receive light ray deflection means positioned to deflect rays of light having pathways generally lateral to the cartridge toward and through said transparent rear plate, said aperture window and said transparent front plate of the aperture assembly of said cartridge.

12. The teaching system as defined in claim 11 in combination with a projector, or viewing, apparatus having light ray deflection means adapted to be positioned within the central core opening of the cartridge.

13. The teaching system as defined in claim 11 in combination with a rear screen projector having light ray deflection means adapted to be positioned within the central core opening of the cartridge.

14. The teaching system as defined in claim 11 in combination with a front screen projector having light ray deflection means adapted to be positioned within the central core opening of the cartridge.

15. The teaching system as defined in claim 11 in combination with an individual viewer having light ray deflection means adapted to be positioned within said central core opening of said cartridge.

16. The teaching system as defined in claim 11 in combination with an individual viewer having light ray deflection means adapted to be positioned in said central core opening and an eyepiece lens in alignment with the front plate of the aperture assembly.

17. The teaching system as defined in claim 12, in which each of said strips has film advance means comprising toothed means provided to move each of said strips.

18. The teaching system as defined in claim 17, in which each of said film advance means is attached to an operating knob outside of the cartridge casing, and in which the shutter opening means comprises a finger operated portion outside of said cartridge casing.

19. The teaching system as defined in claim 17, in which the film advance means are adapted to be connected to manually operated means included in said projector, or viewing apparatus, and the shutter is adapted to be opened by manually operated means included in said projector, or viewing apparatus, when the cartridge is in position with the light ray deflection means of the projector positioned within said central core opening of the cartridge.

20. The teaching system as defined in claim 1, in which the coding portion of each frame of each transparency comprises at least one opaque area associated with at least one clear area.

21. The teaching system as defined in claim 20, in which the position of the clear area in the coding portion of each frame is fixed at one of a plurality of selectively different portions relative to each frame.

22. The teaching system as defined in claim 21, in which the clear areas in the respective frames of the coding means of the first and second transparencies which indicate correct composite visuals are in the same relative fixed position in the coding portion of each of said frames; so that when the composite visual formed by both frames is in register, both clear portions will be in register.

23. The teaching system as defined in claim 22, in which the clear portion of at least one of the frames in register comprises a correct mark symbol.

24. The teaching system as defined in claim 1, in which the program material comprised in the first and second transparencies comprises at least one color.

25. The teaching system as defined in claim 24, in which different colors are superimposed in the composite visuals formed.

26. The teaching system as defined in claim 25, in which at least one frame of one of said transparencies comprises a plurality of colors, and at least one frame of the other of said transparencies comprises a color which, when in complete or partial register with at least one of the colors of said first mentioned frame, will resolve with at least one color of said first mentioned frame to match another color in said first mentioned frame.

27. The teaching system as defined in claim 1, in which the program material comprises geometrical forms.

28. The teaching system as defined in claim 1, in which the program material comprises arithmetic problems in which a portion of the problem is on the first transparency and a portion on the second transparency to provide correct and incorrect composite visuals of a complete arithmetic problem.

29. The teaching system as defined in claim 1, in which the program material is comprised of representations of verbal problems, in which portions of the problems are on selected frames of the transparencies so that correct and incorrect composite visuals are provided by registering various frames of said transparencies.

30. The teaching system as defined in claim 1, in which the program material comprises pictorial material.

References Cited

UNITED STATES PATENTS

| | | | |
|---|---|---|---|
| 2,038,022 | 4/1936 | Zubli | 35—76 X |
| 2,813,457 | 11/1957 | FitzGerald | 35—76 X |
| 3,010,226 | 11/1961 | Kalnins | 35—28.3 X |
| 3,014,302 | 12/1961 | Hughes | 35—28 |
| 3,303,580 | 2/1967 | Stinar | 35—9 R |

WILLIAM H. GRIEB, Primary Examiner

U.S. Cl. X.R.

40—96; 35—76